United States Patent
Vasquez

(10) Patent No.: US 7,402,328 B2
(45) Date of Patent: Jul. 22, 2008

US007402328B2

(54) STABLE SODIUM-FREE OR LOW-SODIUM AQUEOUS SOLUTION OF AGREEABLE SALTINESS TASTE

(76) Inventor: Ramon Efrain Vasquez, Drumond, Lujan De Cuyo, Lujan De Cuyo, Mendoza, San Martin 2488 (AR) 2488

( * ) Notice: Subject to any disclaimer, the term of this patent is extended or adjusted under 35 U.S.C. 154(b) by 130 days.

(21) Appl. No.: 10/728,827

(22) Filed: Dec. 8, 2003

(65) Prior Publication Data

US 2005/0123670 A1  Jun. 9, 2005

(51) Int. Cl.
*A23L 1/237* (2006.01)

(52) U.S. Cl. .................. 426/649; 426/74; 426/394; 426/648; 426/650

(58) Field of Classification Search .................. 426/74, 426/648, 649, 650, 394
See application file for complete search history.

(56) References Cited

U.S. PATENT DOCUMENTS

| | | | |
|---|---|---|---|
| 2,968,566 A | 1/1961 | Munch | 99/143 |
| 3,514,296 A | 5/1970 | Frank et al. | 99/143 |
| 4,066,799 A | 1/1978 | Cornelius et al. | 426/649 |
| 4,216,244 A | 8/1980 | Allen, Jr. et al. | 426/649 |
| 4,514,431 A | 4/1985 | Buckholz, Jr. et al. | 426/641 |
| 4,963,387 A | 10/1990 | Nakagawa et al. | 426/649 |
| 5,064,663 A | 11/1991 | Murray et al. | 426/60 |
| 5,213,838 A | 5/1993 | Sheikh | 426/649 |
| 5,562,942 A | 10/1996 | Koh et al. | 426/649 |
| 5,562,943 A | 10/1996 | Koh et al. | 426/649 |

FOREIGN PATENT DOCUMENTS

| | | |
|---|---|---|
| EP | WO 83/00081 | 1/1983 |
| EP | WO 92/16117 | 10/1992 |
| FR | 2.196.151 | 8/1972 |
| JP | 56-179270 | 5/1983 |

*Primary Examiner*—Helen F Pratt
(74) *Attorney, Agent, or Firm*—Neifeld IP Law, PC

(57) ABSTRACT

A stable sodium-free aqueous seasoning solution of agreeable salty taste, adapted as a substitute for common salt in cooked and uncooked foodstuffs, containing purified water, an organic acid, a potassium salt, a calcium salt, and a magnesium salt. The mineral solution provides a dietary supplementation of magnesium, calcium, and potassium—indispensable minerals of a diet—to which colorants, natural essences and artificial essences (singly or in combination), and low concentrations of sodium chloride may be added.

14 Claims, No Drawings

STABLE SODIUM-FREE OR LOW-SODIUM AQUEOUS SOLUTION OF AGREEABLE SALTINESS TASTE

BACKGROUND OF THE INVENTION

1. Field of the Invention

A sodium-free or low-sodium seasoning solution having salty taste.

2. Description of Related Art

The present invention relates to a stable, sodium-free or low-sodium seasoning solution of agreeable salty taste, intended for consumption by the general population, i.e., youth, adults, elderly, and pregnant women. The solution aids in preventing or treating certain diseases, such as hypertension, osteoporosis and obesity, among others, all of which stem from the consumption of sodium. Moreover, the invention acts as a dietary supplement and confers calcium, potassium, and magnesium to the diet.

The invention is intended for use before, during, and after the cooking of foodstuffs, as is done with common table salt, and for the food processing industry. Given its liquid formulation, the product may be supplied in a dropper, a spray for household use, or a container of 5 to 50 liters for the food processing industry.

Because the solution is stable and homogeneous it distributes evenly on foodstuffs—as opposed to common table salt—and it is uniformly absorbed by foodstuffs of all kinds, including sauces, meats, vegetables, dough, juices, cold cuts, and cheese. The unique liquid presentation of the invention allows consumers to accurately dose.

Various solid forms of low-sodium and sodium-free substitutes for common table salt are known. However, to date none has found wide consumer acceptance or provided adequate dosing to meet recommended daily nutritional allowances in the household, restaurant, or food processing industry.

There is an unmet need for natural tasting salt substitutes. We have found that a liquid formulation bestows advantages through its household and industrial usage, has an agreeable saltiness taste in sodium-free or low-sodium form, and is an efficacious dietary supplement for the general population that retains like characteristics of saltiness and can substitute for harmful sodium chloride.

The solid presentations of salt and salt substitutes cannot be accurately dosed because they undergo physical changes under conditions of humidity and vary their color with time. And whenever two or more compounds are used in the production of a salt substitute, homogeneity is very difficult to maintain in the product, because they normally tend to segregate, making the product more expensive, among other things. Production of such salt substitutes requires the use of appropriately sized particles to allow this type of solid salt to flow upon the foodstuffs. And, they require other compounds which make the solid salt more expensive and complex to formulate, such as stabilizing agents, preservatives and anti-humidity agents.

The reason most salt substitutes have failed to achieve the desired success is that they contain mainly potassium chloride, and, therefore, confer a bitter residual taste. In many cases this bitter taste prevents people on sodium-restricted diets from truly avoiding salt, generating grave consequences thereafter. In arterial hypertension for instance, reducing sodium intake is the mainstay, because sodium produces a well-known direct augmentation of blood pressure.

Sodium toxicity to the body is demonstrated through a decrease of nitric oxide (NO) levels. Nitric oxide is a natural substance that is actively involved in cardiovascular system regulation. NO is beneficial to health by maintaining healthy blood vessels, protecting against vascular, heart, cerebral, and renal diseases, reducing arterial tension values by producing vasodilatation, preventing the onset of ischemic diseases because of its antiatherogenic and antithrombotic effect, aiding to combat infections, lowering pulmonary hypertension, and aiding in destroying cancerous tumors.

Pursuant to scientific research, a high-sodium diet reduces nitric oxide levels and thereby augments the risk of cardiac, vascular, renal, and cerebral diseases. Sodium causes arterial pressure to increase mainly through lack of vascular dilatation which follows NO reduction. Restriction of sodium intake, in turn, aids in the prevention and treatment of various diseases and improves overall public health. That a simple dietary measure, i.e., sodium intake reduction, prevents arterial hypertension—a disease that retains high rates of morbidity and mortality in developed countries—has been proven. The 50 million Americans with hypertension are advised to eat a low-sodium diet, about 1,500 milligrams a day.

Current nourishment in industrialized countries does not bestow the quantity of basic nutrients for a complete diet in children, adolescents, pregnant women and elderly. Therefore, the body requires nutrients bestowed by dietary supplements found in massive elements, such as water and salt, which humans must consume every day. That humans will pay to drink low-sodium water but cannot readily find low-sodium solid nourishment, which would benefit their health, sounds contradictory.

The Food and Drug Administration recommends a daily, 500 mg minimal and 2,400 mg maximal, sodium intake. Notwithstanding this recommendation, the average American consumes more than 4,000 mg per day; three-fourths of which comes from processed foodstuffs and ingested nourishment. The American Public Health Association (APHA) has published a proposal to reduce sodium content in processed foodstuffs by 50% within the next 10 years. The APHA estimates the change could cut the number of hypertension sufferers by 20 percent, eventually saving 150,000 lives a year. The FDA is currently considering enactment of regulations on sodium levels in foodstuffs that claim to have "healthy nutrients."

A reduction of sodium intake is prescribed to patients with diseases that affect the cardiovascular system because many of these patients present altered renal capacities to excrete the sodium.

A reduction in salt intake in patients with light cardiac insufficiency can substantially improve measures against symptoms, facilitate the activation of certain medication and, thusly, ameliorate the quality of life of said patients. Cardiac ischemic disease constitutes the foremost cause of death in the Western world. Over 5 million people in the United States alone are annually diagnosed with the disease.

As per the Department of Medicine, Division of Gastroenterology, University of Massachusetts Medical Center, gastric cancer is the second most common cause of cancer relating to mortality in the world and the $14^{th}$ of all causes of mortality. Detection of the disease commonly occurs at an advanced stage and the overall survival rate is poor. Sodium retains a positive correlation to the incidence of gastric cancer. One of the recurrent findings from the medical testings performed on patients with gastric cancer is that of elevated salt intake.

Patients presenting renal insufficiency must restrict sodium intake in order to control known metabolic alterations, such as hydrosilane retention, and evade the progression of the insufficiency. Said measure reduces the formation of edemas and helps to control arterial pressure—above-normal rates contribute to the progression of the renal damage.

In accordance with the National Heart, Lung and Blood Institute (NHLBI), overweight individuals consume more calories and more sodium. Consequently, they retain more sodium than individuals who are not overweight.

In addition, research conducted by the NHLBI suggests an increase of 89% in mortality risk amongst overweight adults, due to cerebral damage, for every additional 100 mmol of sodium ingested.

A diet consistent with high sodium intakes reduces the level of nitric oxide and, in turn, augments the risk of undergoing cardiac, vascular, renal and cerebral diseases.

Under such a standpoint, a diet consistent with a low-sodium intake benefits the hypertensive, elderly, obese, salt sensitive, pregnant women, children, Syndrome X patients—those afflicted by insulin resistance, hyperinsulinism, abnormal intolerance to glucose, arterial hypertension, hypertriglyceridemia, and low HDL—cholesterol—as well as the overall population.

Causes for cardiovascular disease in adults commence at an early age. Said diseases must be prevented at the commencement of childhood. High blood pressure is an important factor of cardiovascular risk. Accordingly, pediatricians should control not only children undergoing hypertension but also those who are normotensive. Preemptive measures should be duly taken to modify factors, such as obesity and high salt intake, which lead to obesity.

The aforementioned liquid presentation harbors many benefits that solid salt does not, such as easy utilization, utter homogeneity, accurate dosing, enhanced and uniform absorption by the varied types of foodstuffs—sauces, meats, vegetables, dough, juice, cold cuts, and cheese. Moreover, liquid salt retains advantageous applications, diversity of presentations, stability in humidity, unalterability, and physical unchangeability.

A calcium and potassium rich diet is beneficial to health. Calcium is indispensable to osseous health. "A salt (sodium chloride) rich diet is prejudicial to osseous health as it increase the loss of urinary calcium," purported by Dr. Sellmeyer, Director the University of California San Francisco and suggested by Mt. Zion Osteoporosis Center. Also, because the body requires calcium for many other functions—including muscular contraction—if calcium excretion is heightened, the body responds by extracting calcium directly from the bones, weakening them, i.e., activating the onset of osteoporosis. Hence, the body must receive an adequate quantity of calcium—between 1,000 and 1,300 mg per day. The research performed by Dr. Sellmeyer suggests that a diet rich in potassium could counterattack the negative effect, on osseous health, of a diet rich in salt (sodium chloride).

Calcium from said diet is insufficient, hence, the need to strengthen it. To achieve a proper intake of minerals massively, the enrichment of water and salt with these nutrients is imperative. Regarding water, schemes have been concocted via usage of mineral water. Regarding salt, the invention herein will confer a like effect.

Calcium holds many benefits. It aids in regulating muscular contractions, performs a considerable role in blood clotting, maintains cellular membranes, and helps absorption of vitamin B12. Furthermore, calcium controls obesity by reducing levels of corporeal fats via enzyme activation, such as lipase—a fat degrading enzyme. Calcium also prevents colon cancer as it neutralizes natural acids of the digestive system—fatty acids and biliary juices—that irritate and damage the walls of the colon. Yet another benefit of calcium is its aiding to avoid the formation of renal calculi (or kidney stones.) A paper presented by Harvard University suggests that those who consume a greater quantity of calcium are less prone to form renal calculi.

Dietary supplements of calcium and potassium decrease hypertension. Accordingly, as purported at the "The Seventh Report of the Joint National Committee on Prevention, Detection, Evaluation and Treatment of Blood Pressure 2003" by the National Heart, Lung and Blood Institute's National High Blood Pressure Education Program, all people should adopt healthy lifestyles to prevent the augmentation of blood pressure and, those who are undergoing hypertension, should do so via a feeding program of the Dietary Approaches to Stop Hypertension (DASH)—a diet enriched in calcium and potassium and reduced in sodium.

As stated hereinbefore, potassium confers a fundamental effect on health as it protects the human organism from certain diseases, such as osteoporosis and hypertension. The increase of potassium content augments the quantity of sodium excreted by the body. The recommended daily allowance of potassium is 2,000 mg. Albeit some experts recommend a 3,500 mg daily intake to prevent high blood pressure. Nonetheless, the average American ingests between 800 and 1,500 mg of potassium per day.

Reports suggest that the rate of regional deaths due to cardiovascular diseases is inversely proportionate to the hardness of the water drank. Magnesium in hard water produces said protective effect. Magnesium is insufficient, in modern foodstuffs, to meet daily requirements. That magnesium supplements protect against cardiovascular damage and arrhythmias has been proven.

The recommended daily allowance of magnesium is between 300 and 500 mg. Albeit, in industrialized countries, only 250 mg of magnesium are ingested per day.

Pursuant to what is recounted hereinbefore, the procurement of a sodium-free or low-sodium, liquid salt that utterly substitutes the well-known, common table salt and contains sufficient quantities of calcium, potassium and magnesium so as to contribute an appropriate dietary supplement is wholly material.

SUMMARY OF THE INVENTION

An object of the invention is to provide a sodium-free or low-sodium aqueous seasoning solution for foodstuffs, comprising: between 60 and 85% by weight of purified water, between 5 and 15% by weight of a potassium salt, between 8 and 18% by weight of an organic acid, between 1 and 3% by weight of a magnesium salt, and between 2 and 15% by weight a calcium salt.

Another object is to provide a method for making a sodium-free or low-sodium aqueous seasoning solution for foodstuffs, containg between 60 and 85% by weight of purified water, between 5 and 15% by weight of a potassium salt, between 8 and 18% by weight of an organic acid, between 1 and 3% by weight of a magnesium salt, and between 2 and 15% by weight a calcium salt, said method comprising:

a) measuring the required amounts of solid raw materials, which may be finely or coarsely powdered, in scales or crystals, b) measuring the required amount of distilled, demineralized water, c) mixing the solid compounds with about 50% of said water until a slurry is formed, and d) adding the remainder of the water to the slurry and agitating until it retains the characteristics of a stable homogeneous solution.

DETAILED DESCRIPTION OF THE PREFERRED EMBODIMENTS

The objectives proposed hereinabove are secured via a stable, aqueous solution with an agreeable salty taste adapted as a seasoning substitute which also acts as a dietary supplement. The components of the solution can be present in various proportions. A preferred aqueous solution contains between 60 and 80% by weight of distilled and demineralized water, between 5 and 15% by weight of potassium chloride, between 8 and 18% by weight of an organic acid, such as citric acid, between 2 and 15% by weight of calcium chloride, and between 1 and 3% by weight of a magnesium salt.

The distilled and demineralized water meets the strict specifications of chemical purity. Said water may be prepared via distillation, use of ionic exchange resins, or inverse osmosis, and may be present within the range of 60 to 85% by weight, preferably about 65 to 75%.

The potassium component is present in the range of 5 to 15% by weight, preferably 8 to 12%. All types of potassium salts that are acceptable for food seasoning are contemplated—preferably, potassium citrate and potassium chloride. Potassium chloride may be present within the range of 0 to 15% by weight. The acidic compound may be present between 8 and 18% by weight, preferably 10 to 12%. All types of acids that are acceptable for food seasoning are contemplated—preferably, citric acid, tartaric acid and/or fumaric acid.

The magnesium salt component may be present within the range of 1 to 3% by weight, preferably 1 to 2%. All types of magnesium salt that are acceptable for food seasoning are contemplated—preferably, magnesium chloride.

The chemical stabilizing and flavoring compounds may be individually present between roughly 0.05 to roughly 2.5% by weight. The specific flavoring agent may vary as per market preferences. The most important flavoring agents include conventional, natural, and synthetic ones. A number of combinations of flavoring agents are contemplated and may be present between 0.05 and 2.5% by weight.

Thickening agents and preservatives that are fit for human consumption may be present and are contemplated. Ingredients one can add to the liquid salt to make it into a gel include Arabic gum, carboxymethylcellulose, pectin, glycerine and xantic gum, in different combinations and in needed amounts. Gel formulations with differing degrees of saltiness can be signified by different gel colors.

Stabilizing agents are not indispensable because the solution is stable, given its salinity and low pH. However, added in small doses, stabilizing agents prolong the life span of the solution. The addition of colorants to the solution that are fit for human consumption is also contemplated.

The salt substitute of the present invention solves the problems with known solid salt replacements because the liquid presentation is completely homogeneous, and free of impurities and precipitates. The present invention does not undergo changes under atmospheric changes, such as humidity and temperature, hence, does not require the addition of anti-humidity agents. Furthermore, production of an aqueous solution does not require a particle size limitation of the raw materials. Moreover, a liquid overcomes any inconvenience of dosing, not only in household usage but for industrial usage, because dosing is more accurately performed in a liquid state.

The present invention is beneficial because it does not contain sodium, or contains it in small quantities, and provides a human dietary supplement of calcium, potassium, and magnesium, all of which are greatly required by the overall population. Accordingly, said invention is beneficial to the population of a country as it prevents the onset of arterial hypertension, osteoporosis, obesity, an increase in arterial pressure and edemas—as well as the complications therefrom—in adults, pregnant women, and children. And, in turn, it strengthens the effects of medication intake for arterial hypertension. Hence, treatment becomes more affordable and effective for all patients, evades the need for medication-based treatments, reduces the need for surgical interventions, additional testing (and the onset of complications therefrom), admittance to hospitals (amongst the hypertensioe), prevents the onset of certain diseases, such as gastric cancer (amongst the overall population), reduces the progression of certain diseases, such as renal insufficiency, and avails in the treatment and prevention of short-term and long-term diseases. Subsequently, said liquid salt is a material benefit for the public health system, private health system, and medical insurance system.

The particular salty taste of the present invention does not produce rejection whatsoever by any person (whether adult or child) owing to a befitting mixture of compounds that boasts the invention to be wholly different from any other product known to date. Given the salinity of the potassium chloride, calcium chloride, and magnesium salt, the characteristically bitter residual taste of potassium chloride is totally neutralized by the acid component, preferably citric acid. Citric acid, in turn, enhances the acid aftertaste and further strengthens the saltiness taste. The aqueous solution imitates the taste of common table salt as it combines certain characteristics, such as saltiness, bitterness and acidity, which are characteristic of sodium chloride's taste.

Saline capacity is augmented when two or more salty elements are blended. In the present invention, four compounds are combined, conferring an agreeable saltiness taste that is, by no means, bitter.

The present invention may be used on any type of edible product that requires a salty taste, such as soups, broths, juices, vegetables, fish, chicken, meats, mayonnaise, sauces and others.

The following examples describe actual data obtained from paired comparison type taste testing of the stable aqueous solution of the present invention and commercially available salt and salt substitute.

EXAMPLE 1

Testing the present invention against a commercially available table salt in mayonnaise.

A low-sodium or sodium-free aqueous solution of agreeable saltiness taste in accordance with the present invention was subjected to consumer acceptance taste testing, by a panel of 50 untrained judges between the ages of 12 and 72, with respect to commercially accepted salt in the well-accepted test medium of mayonnaise. Two mayonnaise samples were prepared, one containing common table salt and the other containing the solution of the present invention. The commercially available salt (Morton's iodized salt) in the mayonnaise composition constituted the reference sample.

The aqueous solution of the invention contained 65% by weight of distilled and demineralized water, 12% by weight of citric acid, 10% by weight of potassium chloride, 7.5% by weight of calcium chloride, and 1% by weight of magnesium chloride. This was added to a like mayonnaise composition and constituted the test sample.

Acceptance testing of the test samples versus the reference samples was based upon a rating of samples on the "Hedonic" scale described by D. R. Peryam and F. J. Pilgram, "Hedonic Scale Method of Measuring Food Preferences," Food Technology, 11(9); 9-14, 1957. The Hedonic scale equates the numerical values 1-9 to successive scale points from the "dislike" end of the scale to the "like" end of the scale. Thus, samples were rated by each panelist or judge and mean ratings for the samples were developed and compared statistically.

The rating results of the 50 judge panel with respect to "saltiness flavor" showed a mean rating for the reference samples (mayonnaise composition with common table salt added) of 6.42 and a mean rating for the test sample (mayonnaise composition with the stable aqueous solution) of 6.23. The rating results of the panel with respect to "overall desirability" showed a rating for the reference sample of 6.82 and mean rating for the test sample of 7.05. From the above taste testing results, it can be stated with greater than 99% certainty that, for the mayonnaise compositions compared, there is no statistically significant difference in "saltiness flavor" or "overall desirability" between common table salt and the sodium-free stable aqueous solution of the present invention.

EXAMPLE 2

Testing the present invention versus a commercially available salt substitute in mayonnaise.

A low-sodium or sodium-free aqueous solution in accordance with the present invention was subjected to consumer acceptance taste testing, by a panel of 75 untrained judges of both sexes and various ages, with respect to a commercially accepted salt substitute, in the well-accepted test medium of mayonnaise. Two mayonnaise samples were prepared, the "reference sample" containing a commercial salt substitute ("Morton's low-sodium salt substitute") and the test sample containing the present invention. The Morton's low-sodium salt substitute contained 49.547% by weight of sodium chloride, 49.627% by weight of potassium chloride and 0.826% by weight of other ingredients. The present invention contained 65% by weight of distilled and demineralized water, 12% by weight of citric acid, 10% by weight of potassium chloride, 7.5% by weight of calcium chloride, and 1% by weight of magnesium chloride. Both samples contained like mayonnaise compositions.

Acceptance testing of the test samples versus the reference samples was based upon a rating of samples on the "Hedonic" scale as described above.

The rating results of the 75 judge panel with respect to "saltiness flavor" showed a mean rating for the reference samples (mayonnaise with Morton's low-sodium salt substitute) of 6.34 and a mean rating for the test sample (mayonnaise composition with the present invention) of 6.31. The rating results of the panel with respect to "overall desirability" showed a rating for the reference sample of 4.18 and mean rating for the test sample of 6.95. From the above taste testing results, it can be stated with greater than 99% certainty that, for the mayonnaise compositions compared, there is no statistically significant difference in "saltiness flavor" between Morton' low-sodium (19.48% by weight of sodium) salt substitute and the sodium-free (0% by weight of sodium) stable aqueous solution of the present invention. However, it can also be stated that there is a strong inclination in "overall desirability" towards the test sample.

Although the invention has been described with reference to particular embodiments, it should be understood that these serve to illustrate the principles and applications of the invention. Numerous modifications can be made without departing from the sprit and scope of the invention, as defined by the appended claims.

The invention claimed is:

1. A sodium-free or low-sodium aqueous seasoning solution for foodstuffs, consisting essentially of between 60 and 85% by weight of purified water, between 5 and 15% by weight of potassium chloride, between 8 and 18% by weight of tartaric acid, between 1 and 3% by weight of a magnesium salt, and between 2 and 15% by weight a calcium salt.

2. The seasoning solution of claim 1, wherein the magnesium salt is magnesium chloride.

3. The seasoning solution of claim 1, wherein the calcium salt is calcium chloride.

4. The seasoning solution of claim 1, wherein purified water is distilled and demineralized water.

5. The seasoning solution of claim 1, which is colorlessness, odorlessness, and has heightened salinity in taste.

6. The seasoning solution of claim 1, which is stable and does not require refrigeration.

7. The seasoning solution of claim 1, wherein flavoring agent natural or artificial essences, colorants, and aromatizers are added.

8. The seasoning solution of claim 7, wherein flavoring agents comprise between 0.05 and 2.5% by weight, and are selected from the group consisting of essences of garlic, pepper, onion, lemon, celery, sweet basil, thyme, parsley, sweet red pepper, and spicy red pepper, and mixtures thereof.

9. The seasoning solution of claim 1, which comprises a stable aqueous solution adapted as a seasoning composition for foodstuffs before, during, and after cooking.

10. The seasoning solution of claim 1, further comprising up to 20% by weight sodium chloride.

11. The seasoning solution of claim 1, further comprising between 0.05 and 2.5% by weight stabilizing agents fit for human consumption selected from thickening agents and preservatives.

12. The seasoning solution of claim 1, provided for household use in a bottle with a dropper or sprayer.

13. The seasoning solution of claim 1, wherein said solution acts as a dietary supplement of dietary minerals, supplying magnesium, calcium, and potassium.

14. A method for making a sodium-free or low-sodium aqueous seasoning solution for foodstuffs, consisting of between 60 and 85% by weight of purified water, between 5 and 15% by weight of potassium chloride, between 8 and 18% by weight of tartaric acid, between 1 and 3% by weight of a magnesium salt, and between 2 and 15% by weight a calcium salt, said method comprising: a) measuring the required amounts of solid raw materials, which may be finely or coarsely powdered, in scales or crystals, b) measuring the required amount of distilled, demineralized water, c) mixing the solid compounds with about 50% of said water until a slurry is formed, and d) adding the remainder of the water to the slurry and agitating until it retains the characteristics of a stable homogeneous solution.

* * * * *